United States Patent [19]

Maynard et al.

[11] Patent Number: 5,673,366

[45] Date of Patent: Sep. 30, 1997

[54] SYSTEM AND METHOD FOR GEOMAGNETIC AND IONOSPHERIC FORECASTING

[76] Inventors: Nelson C. Maynard, 33 Sandhill Dr., Merrimack, N.H. 03054; Daniel N. Baker, 5277 Deercreek Ct., Boulder, Colo. 80301; John W. Freeman, Jr., 9206 Mullins Dr., Houston, Tex. 77096; George L. Siscoe, 68 Dutton Rd., Sudbury, Mass. 01776; Dimitris V. Vassiliadis, 6100 Westchester Park Dr., Apt. 405, College Park, Md. 20740

[21] Appl. No.: 583,428

[22] Filed: Jan. 5, 1996

[51] Int. Cl.$^6$ .................................................. G06F 15/18
[52] U.S. Cl. ............................. 395/20; 395/11; 395/21
[58] Field of Search ................................. 395/20, 11, 21; 364/483; 324/345

[56] References Cited

U.S. PATENT DOCUMENTS 5,444,820  8/1995  Tzes et al. ................................. 395/22

OTHER PUBLICATIONS

J. Freeman et al., "The Use of Neural Networks to Predict Magnetospheric Parameters for Inputs to a Magnetospheric Forecast Model", Proceedings of the International Workshop on Artificial Intelligence Applications in Solar–Terrestrial Physics (J. Joselyn et al., Ed.), Lund, Sweden, Sep. 22–24, 1993, pp. 167–181.

J. Freeman et al., "The Magnetospheric Specification and Forecast Model: Moving From Real–Time to Prediction", Solar–Terrestrial Predictions—IV, Proceedings of a Workshop at Ottawa, Canada (J. Hruska et al., Ed.), Ottawa, Canada, May 18–22, 1992, pp. 524–539.

M.S. Gussenhoven et al., "Systematics of the Equatorward Diffuse Auroral Boundary", Journal of Geophysical Research, vol. 88, No. A7, Jul. 1, 1983, pp. 5692–5708.

D.A. Hardy et al., "Statistical and Functional Representations of the Patterns of Auroral Energy Flux, Number Flux, and Conductivity", Journal of Geophysical Research, vol. 92, No. A11, Nov. 1, 1987, pp. 12,275–12,294.

J.P. Heppner and N.C. Maynard, "Empirical High–Latitude Electric Field Models", Journal of Geophysical Research, vol. 92, No. A5, May 1, 1987, pp. 4467–4489.

J.P. Kennealy et al., "CBSD: The Celestial Background Scene Descriptor", PL–TR–93–2215, Phillips Laboratory, Air Force Materiel Command, Hanscom Air Force Base, Massachusetts, Jan. 1993, pp. i.–xii. and pp. 1–214.

(List continued on next page.)

Primary Examiner—Tariq R. Hafiz
Assistant Examiner—Jason W. Rhodes
Attorney, Agent, or Firm—Dilworth & Barrese

[57] ABSTRACT

A system and method forecast geomagnetic events and resulting currents from ground and space weather data, including solar wind velocity data and interplanetary magnetic field data. The system has a processor including a first prediction generator for predicting a midnight equatorial boundary (MEB) value; a second prediction generator for predicting a polar cap potential (PCP) value from the ground and space weather data; an AL and AU prediction generator for predicting AL and AU values; a pseudo Kp value generator for generating a pseudo Kp related value; an electric field pattern generator for determining electric field patterns from the pseudo Kp value, the PCP value, and the ground and space weather data; a conductivity generator for determining conductivity values from the ground and space weather data and the pseudo Kp value; and an adaptive feedback generator for adaptively generating the geomagnetic parameters from the conductivity values, the electric field values, and the predicted AL and AU values. The geomagnetic forecasting system and method forecast geomagnetic parameters and events such as the occurrence of magnetic storms and substorms and their effects on ionospheric currents using ground and space-based measurements.

19 Claims, 5 Drawing Sheets

OTHER PUBLICATIONS

F.J. Rich and N.C. Maynard, "Consequences of Using Simple Analytical Functions for the High–Latitude Convection Electric Field", Journal of Geophysical Research, vol. 94, No. A4, Apr. 1, 1989, pp. 3687–3701.

O.A. Troshichev et al., "Magnetic Activity in the Polar Cap—A New Index", Planetary Space Science, vol. 36, No. 11, 1988, pp. 1095–1102.

D. Vassiliadis et al., "A Description of Solar Wind–Magnetosphere Coupling Based on Nonlinear Filters," Journal of Geophysical Research, vol. 100, No. A3, Mar. 1, 1995, pp. 3495–3512.

D. Vassiliadis, "The Input–State Space Approach to the Prediction of Auroral Geomagnetic Activity from Solar Wind Variables", Proceedings of the International Workshop on Artificial Intelligence Applications in Solar Terrestrial Physics (J. Joselyn et al., Ed.), Lund, Sweden, Sep. 22–24, 1993, pp. 145–151.

D.R. Weimer, "Models of High–Latitude Potentials Derived with a Least Error Fit of Spherical Harmonic Coefficients", Journal of Geophysical Research, vol. 100, No. A10, Oct. 1, 1995, pp. 19,595–19,607.

Alberston, V.D. et al. "Geomagnetic Disturbance Effects on Power Systems." IEEE Transactions on Power Delivery. vol. 8, No. 3, pp. 1206–1216 Jul. 1993.

SYSTEM AND METHOD FOR GEOMAGNETIC AND IONOSPHERIC FORECASTING

BACKGROUND INFORMATION

1. Technical Field

This disclosure relates to environmental forecasting, and in particular to a system and method for forecasting geomagnetic and electrodynamic parameters and events using ground and space-based measurements.

2. Description of the Related Art

Technological systems in space and on the Earth's surface are subject to adverse effects from solar-driven space weather effects. Magnetic storms and substorms impact the distribution and intensity of currents in the ionosphere and energetic particle precipitation into the ionosphere. A visual manifestation of these effects is the aurora borealis or northern lights. Such geomagnetic activity has been known to disrupt communications, degrade navigation sensors, induce currents in long power lines and pipelines, etc.

For example, one magnetic storm is known to have induced sufficient currents to disrupt the entire Hydro Quebec power grid, causing a four hour blackout of all of Quebec. The cause of these disturbances is episodic energy and mass releases from the Sun. The prediction of the occurrence of magnetic storms and substorms and their effects on ionospheric currents may facilitate implementation of mitigating actions to minimize the adverse effects of such storms.

Known methods for forecasting use geomagnetic indices such as Kp, AE, AU, and AL. Geomagnetic indices are derived from ground magnetometer measurements. Variable currents in the ionosphere cause changes in the Earth's magnetic field. The AE, AU, and AL are typically instantaneous quantities determined for each minute after the fact, as opposed to forecasts. Also, the Kp indicator is typically a three hour index, but not a rapidly varying quantity. In addition, the AL and AU indices relate to maximum magnitudes of ionospheric currents at auroral latitudes but may not provide information as to the longitudinal or local distribution of such currents or the size of patterns of currents. For these reasons, known forecasting based on the Kp, AE, AU, and AL indices are thus limited in accuracy and do not provide location-specific information on the ionospheric currents.

One additional index is the daily average 10.7 cm. flux level of radio emissions from the Sun, labelled F10.7. The F10.7 index is commonly used in the art as a proxy for the solar ultraviolet (UV) radiation that is an ionization source for the ionosphere. This is determined daily at the Ottawa Observatory and is distributed by the NOAA Space Environment Services Center (SESC).

SUMMARY OF THE INVENTION

The disclosed geomagnetic forecasting system and method provide the capacity for forecasting geomagnetic parameters and events such as the occurrence of magnetic storms and substorms and their effects on ionospheric currents using predictive and time-varying ionospheric and space-based measurements with improved information on the distribution, size, and specific location of current patterns. Such a system and method facilitate implementation of mitigating actions to minimize the effects of such storms.

A system and method for forecasting geomagnetic events from ground and space weather data, including solar wind velocity data and interplanetary magnetic field data are disclosed, having a processor including a first prediction generator for predicting a midnight equatorward boundary (MEB) of the diffuse aurora from the ground and space weather data; a second prediction generator for predicting a polar cap potential (PCP) value from the ground and space weather data; an AL and AU prediction generator for predicting AL and AU values from the ground and space weather data; means for generating a pseudo Kp value from the MEB value; an electric field pattern generator for determining electric field patterns from the pseudo Kp value, the PCP value and the ground and space weather data; a conductivity generator for determining conductivity values from the forecast time, the ground and space weather data, and the pseudo Kp value; and an adaptive feedback generator for adaptively generating the geomagnetic parameters from the conductivity values, the electric field values, and the predicted AL and AU values.

BRIEF DESCRIPTION OF THE DRAWINGS

The features of the disclosed geomagnetic forecasting system and method will become more readily apparent and may be better understood by referring to the following detailed description of illustrative embodiments of the present invention, taken in conjunction with the accompanying drawings, in which.

DESCRIPTION OF THE PREFERRED EMBODIMENTS

Figure 1:
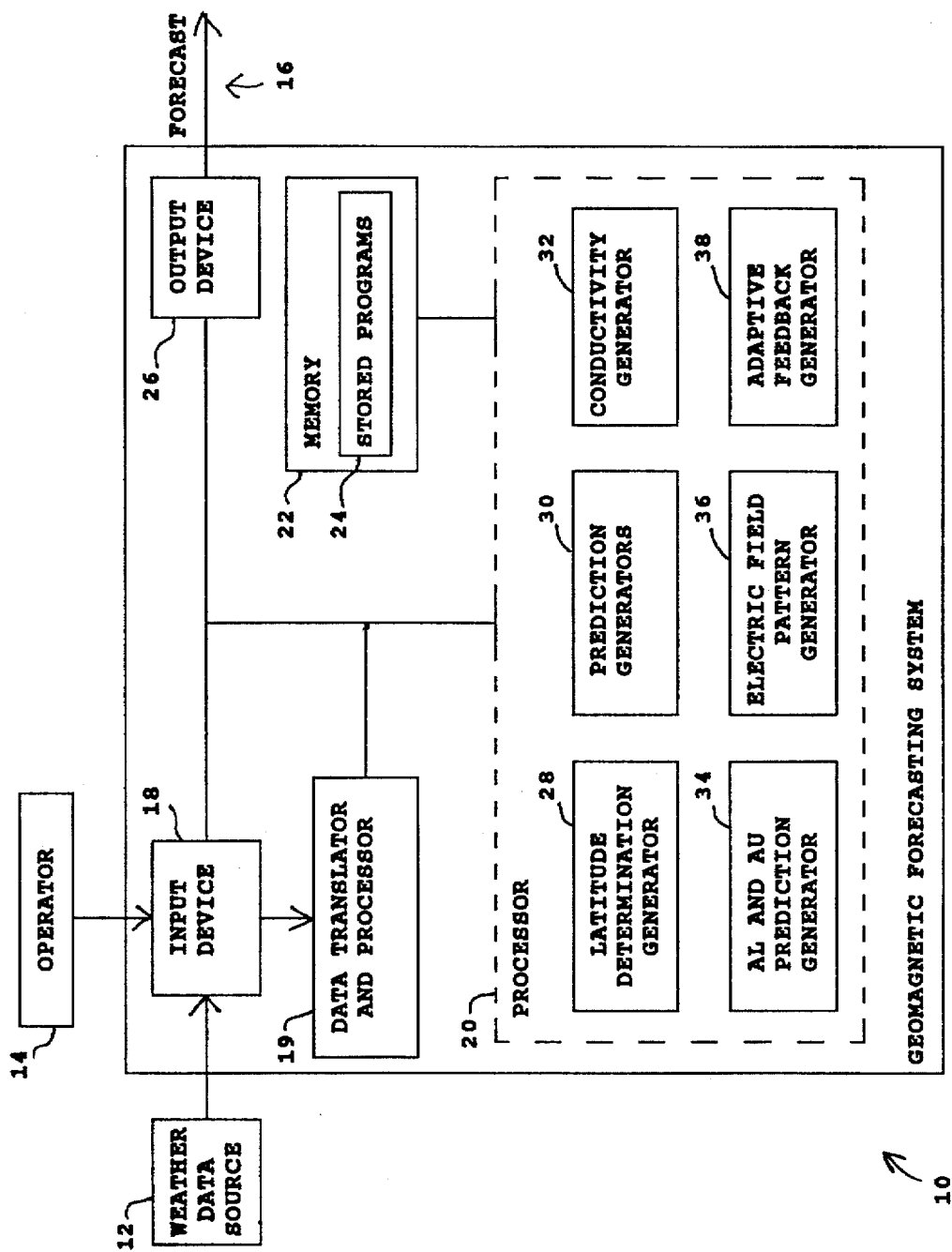
FIG. 1 is a block diagram of the disclosed geomagnetic forecasting system.

Referring now in specific detail to the drawings, with like reference numerals identifying similar or identical elements, as shown in FIG. 1, the present disclosure describes a geomagnetic forecasting system 10 and method for forecasting geomagnetic parameters and events such as the occurrence of magnetic storms and substorms and their effects on ionospheric currents using ionospheric and space-based measurements.

In an illustrative embodiment, the geomagnetic forecasting system 10 receives ground and space weather data, including data reflecting activity of the solar wind, such as solar wind velocity, as well as data measuring interplanetary magnetic fields, from a ground and space weather data source 12, such as one or more monitors upstream and in front of the Earth relative to the solar wind, including the NASA WIND and/or ACE satellites. Real-time data may be provided by the NOAA or through other available sources. The ground and space weather data source 12 may provide ground magnetometer data from at least one measuring station in the polar cap, as well as other ground and space-based electromagnetic data measuring, for example, variations in precipitation from the Van Allen radiation belts, variations in magnetic and electric fields, etc. All ground and space weather data are tagged with the time of measurement and instrument location.

The disclosed geomagnetic forecasting system 10 also receives a desired time of a forecast from an operator 14 or, alternatively, increments a previous forecast time stored in the memory 22 to a new forecast time using the processor 20. Using such ground and space weather data, the geomagnetic forecasting system 10 generates and outputs a forecast 16 at each time increment and/or at predetermined or specified times.

In an illustrative embodiment, the geomagnetic forecasting system 10 receives the ground and space weather data at an input device 18, which transmits the ground and space weather data directly, or pre-processes the ground and space weather data using a data translator and processor 19, in a manner known in the art, to provide the ground and space weather data in a format for use by a processor 20. Commands for the processor 20 may also be generated in and transmitted from the input device 18.

The processor 20 is also connected to a memory 22 for storing data and stored programs 24. The processor 20 processes the commands and ground and space weather data to generate output data signals which ate transmitted to an output device 26 for output as the geomagnetic forecast 16 which is a time-varying response to the input ground and space weather data. The resulting forecast 16 may include time-variable patterns of currents, electric fields, and Joule heating which may then be used by the processor 20 or other systems to calculate geomagnetically induced currents (GIC) and/or associated induced voltages and parameters applicable to communication, navigation, and other areas in which geomagnetic effects cause problems. For example, the disclosed geomagnetic forecasting system 10 may operate to generate predictions of ionospheric storms which may adversely affect electrical power grids.

In an illustrative embodiment, the geomagnetic forecasting system 10 is a "SPARC 10" workstation available from SUN MICROSYSTEMS, INC. having a microprocessor as processor 20, about 8 MB associated RAM memory and a hard or fixed drive as memory 22. The processor 20 operates using the UNIX operating system to run application software as the stored programs 24, providing programs and subroutines for implementing the geomagnetic forecasting system 10 and method.

The input device 18 may include a keyboard, a mouse, and/or a data reading device such as a disk drive for receiving commands and the ground and space weather data in input data files from storage media such as a floppy disk or an 8 mm storage tape. Alternatively, the input device 18 may include connections to external systems as the ground and space weather data source 12 for providing time-tagged real-time ground and space weather data. The received ground and space weather data coming from various locations may be propagated to a common input location, and may be averaged appropriately in the data translator and processor 19 for inputs to various subsystems.

The received ground and space weather data may then be stored in memory 22 for further processing to generate the geomagnetic forecast 16. In addition, through the input device 18, the user may select and/or input commands using a mouse. The input device 18 and output device 26 may also be incorporated as an input/output (I/O) interface, which may include a graphic user interface (GUI).

The processor 20 generates the output data signals as geomagnetic parameters representing the geomagnetic forecast 16, and the output data signals are sent to the output device 26 such as a display for display thereof. Alternatively, the output device 26 may include specialized graphics programs to convert the generated geomagnetic data to a displayed graphic. In additional embodiments, the outputs may be listed in files which may be electronically transmitted to customers or used for output as columns or tables of text by the output device 26 which may be a display or a hard copy printer.

The geomagnetic forecasting system 10 performs the application programs and subroutines, described hereinbelow in conjunction with FIGS. 2–6, which are implemented from compiled or interpreted source code in the FORTRAN programming language. It is understood that one skilled in the art would be able to use other programming languages such as C++ to implement the geomagnetic forecasting system 10 and method. In an illustrative embodiment, the processor 20 of the geomagnetic forecasting system 10 includes a latitude determination generator 28, a plurality of prediction generators 30, a conductivity generator 32, an AL and AU prediction generator 34, an electric field pattern generator 36, and an adaptive feedback generator 38. Such components 28–38 may be implemented in hardware and/or software for operating in a manner as described below.

As described herein, the parameters "AL" and "AU" designate indices representing a maximum negative disturbance and a maximum positive disturbance, respectively, of auroral electrojet currents, as known in the art. AL and AU are components of the commonly used AE index for specifying levels of magnetic activity, in which AE represents the strength of auroral activity on a linear scale. Kp is an index of global magnetic activity on a logarithmic scale.

For clarity of explanation, the illustrative embodiments of the disclosed geomagnetic forecasting system and method are presented as having individual functional blocks, which may include functional blocks labelled as "generator", "processor" and "processing unit". The functions represented by these blocks may be provided through the use of either shared or dedicated hardware, including, but not limited to, hardware capable of executing software. For example, the functions of the generators, processor and processing unit presented herein may be provided by a shared processor or by a plurality of individual processors. Moreover, the use of the functional blocks with accompanying labels herein is not to be construed to refer exclusively to hardware capable of executing software. Illustrative embodiments may include digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided. Any and all of these embodiments may be deemed to fall within the meaning of the labels for the functional blocks as used herein.

The latitude determination generator 28 is responsive to input dates and times for determining the latitude of the sub-solar point, in a manner known in the art, such as the methods described in "Explanatory Supplement to the Astronomical Almanac" (P. K. Seidelmann, Ed.), University Science Books: Mill Valley, Va., 1992; as well as other astronomy textbooks. The geomagnetic forecasting system 10 and method employs a subroutine using, for example, components of the CBAMP code described in J. P. Kennealy et al., "CBSD: The Celestial Background Scene Descriptor", PL-TR-93-2215, Phillips Laboratory, Air Force Materiel Command, Hanscom Air Force Base, Mass., January 1993, pp. i.–xii. and pp. 1–214. The sub-solar latitude determines a portion of the Earth which is illuminated, that sets the extent of influence of the solar-UV-induced conductivity in the conductivity generator 32.

The prediction generators 30 include neural networks and/or similar numerical or analytic predictors. For example, the prediction generators 30 include a first neural network for determining the equatorward edge of the auroral oval at midnight; i.e. the MEB. The prediction generators 30 also include a second neural network for determining the cross-polar-cap potential (PCP). Such neural networks may be trained and implemented as described in J. Freeman et al., "The Use of Neural Networks to Predict Magnetospheric Parameters for Inputs to a Magnetospheric Forecast Model", PROCEEDINGS OF THE INTERNATIONAL WORKSHOP ON ARTIFICIAL INTELLIGENCE APPLICATIONS IN SOLAR-TERRESTRIAL PHYSICS (J. Joselyn et al., Ed.), Lund, Sweden, Sep. 22–24, 1993, pp. 167–181. A third neural network may also be used to determine the Kp value and/or a pseudo Kp value.

In one embodiment, the neural networks may be trained to provide respective predictions one hour in advance of the current coordination time of the geomagnetic forecasting system 10 and method; i.e. a common temporal reference of the processing of the various components and steps of the geomagnetic forecasting system 10 and method. It is understood that prediction generators other than neural networks may be used, such as computer-based models using statistics.

The conductivity generator 32 implements a statistically based conductivity value generation method using a conductivity model, such as the technique described in D. A. Hardy et al., "Statistical and Functional Representations of the Patterns of Auroral Energy Flux, Number Flux, and Conductivity", JOURNAL OF GEOPHYSICAL RESEARCH, VOL. 92, NO. A11, Nov. 1, 1987, pp. 12,275–12,294.

The AL and AU prediction generator 34 may implement an input-state space technique for predicting the AL and AU values; for example, generator 34 may use the techniques described in D. Vassiliadis et al., "An Empirical Model Relating the Auroral Geomagnetic Activity to the Interplanetary Magnetic Field", GEOPHYSICAL RESEARCH LETTERS, VOL. 20, 1993, pp. 1731–1734; D. Vassiliadis, "The Input-State Space Approach to the Prediction of Auroral Geomagnetic Activity from Solar Wind Variables", PROCEEDINGS OF THE INTERNATIONAL WORKSHOP ON ARTIFICIAL INTELLIGENCE APPLICATIONS IN SOLAR TERRESTRIAL PHYSICS (J. Joselyn et al., Ed.), Lund, Sweden, Sep. 22–24, 1993, pp. 145–151; and D. Vassiliadis et al., "A Description of Solar Wind-Magnetosphere Coupling Based on Nonlinear Filters", JOURNAL OF GEOPHYSICAL RESEARCH, VOL. 100, NO. A3, Mar. 1, 1995, pp. 3495–3512.

The input-state space techniques are used to predict the AL and AU indices which are related to the maximum currents in the high latitude ionosphere, as described in greater detail below.

In an illustrative embodiment, the electric field pattern generator 36 implements a statistically based electric field pattern generation technique using an electric field model for determining and adjusting the electric field patterns in a manner known in the art, such as the techniques described in J. P. Heppner and N. C. Maynard, "Empirical High-Latitude Electric Field Models", JOURNAL OF GEOPHYSICAL RESEARCH, VOL. 92, NO. A5, May 1, 1987, pp. 4467–4489; and in F. J. Rich and N. C. Maynard, "Consequences of Using Simple Analytical Functions for the High-Latitude Convection Electric Field", JOURNAL OF GEOPHYSICAL RESEARCH, VOL. 94, NO. A4, Apr. 1, 1989, pp. 3687–3701. It is to be understood that other statistical models may be used. For example, the techniques described in D. R. Weimer, "Models of High-Latitude Potentials Derived with a Least Error Fit of Spherical Harmonic Coefficients", JOURNAL OF GEOPHYSICAL RESEARCH, VOL. 100, NO. A10, Oct. 1, 1995, pp. 19,595–19,607; may also be used.

The adaptive feedback generator 38 provides a feedback mechanism for adaptively adjusting electrodynamic and geomagnetic parameters such as electric fields, Joule heating, perpendicular currents, parallel currents, and Hall currents based on outputs of the prediction generators 30 and the AL and AU prediction generator 28. Using a pattern of values of one of such geomagnetic parameters, the adaptive feedback generator 38 may determine a characteristic maximum value of the pattern using Comparators or a sorting mechanism.

The adaptive feedback generator 38 responds to geomagnetic indices derived from measurements of the geomagnetic parameter at ground level or predicted by other means described herein with reference to the maximum value for determining variations in the measurements. Comparators or other circuitry may be included in the adaptive feedback generator 38 for comparing the variations with a predicted value of the AL parameter, and then adjusting the geomagnetic parameter in response to the comparison for scaling the geomagnetic parameters with reference to the predicted AL and AU parameters.

The processor 20 may include other components and/or software for performing other functions. For example, the processor 20 processes the PC index from real-time ground magnetometer data from at least one measuring station in the polar cap, using the technique described in O. A. Troshichev et al. et al., "Magnetic Activity in the Polar Cap—A New Index," PLANETARY SPACE SCIENCE, VOL. 36, NO. 11, 1988, pp. 1095–1102. The PC index may be used as an input to the AL and AU prediction generator to aid in initialization and to determine real-time AL and AU values to perform quality control of the predictive values.

Figure 2:
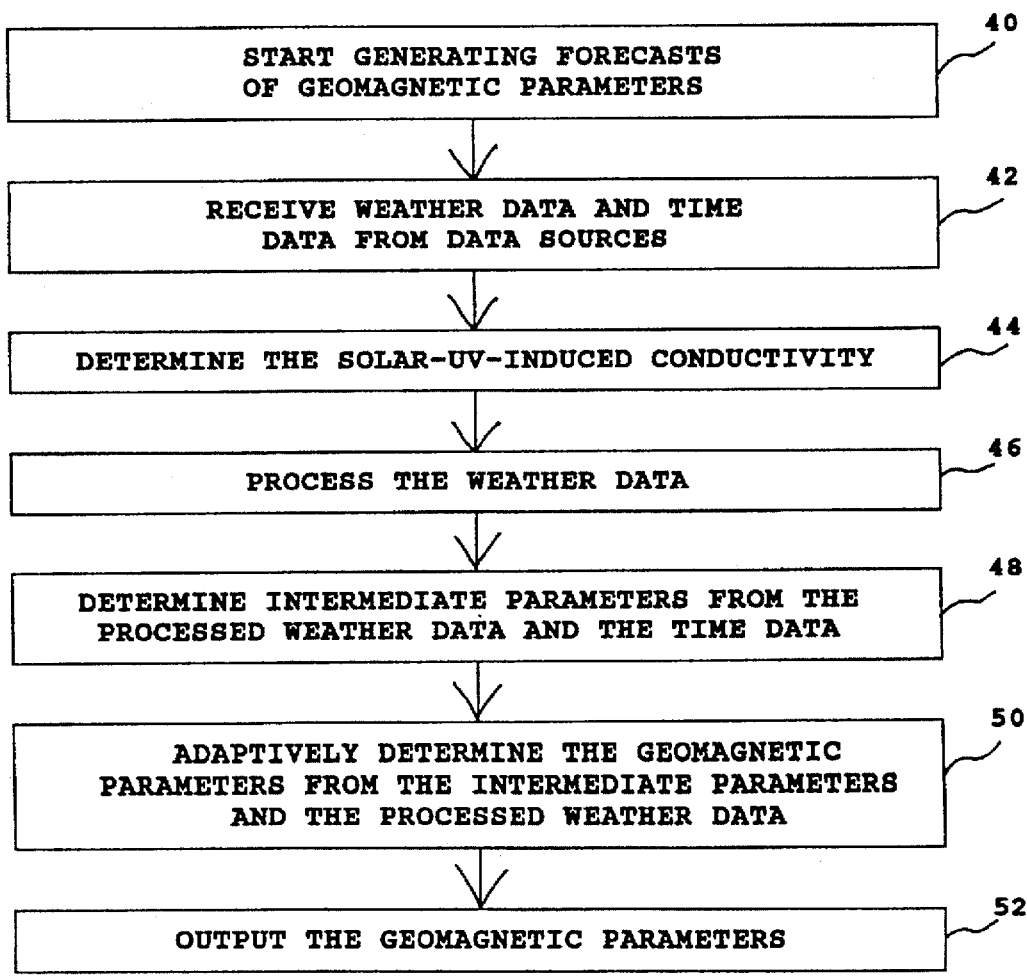
FIG. 2 is a flowchart of the method of operation of the disclosed geomagnetic forecasting system.

As shown in FIG. 2, the method includes the steps of starting the generation of forecasts of geomagnetic parameters in step 40 using the geomagnetic forecasting system 10; receiving ground and space weather data in step 42 from data source 12; determining solar-UV-induced conductivity in step 44; processing the ground and space weather data in step 46; determining intermediate parameters from the processed ground and space weather data in step 48; adaptively determining geomagnetic parameters in step 50 associated with the input ground and space weather data and time data; and outputting the geomagnetic parameters in step 52 as the geomagnetic forecast 16.

In one embodiment, the geomagnetic parameters may be output on a display as the output device 26 in the form of geomagnetic coordinate current patterns, geographic coordinate current patterns, and specific location tracking of the overhead currents and associated ground magnetic variations.

In operation, the method responds to incoming weather and time data, in which upstream solar wind data from the ground and space weather data source 12 is propagated to the nose of the magnetopause with a duration of $t_p$. For each time step of, for example, about 2.5 minutes, propagated solar wind data are applied to the AL and AU prediction generator 34 for prediction of a current value of AL at a coordination time of UT. The current value of AL and a set of previous values of AL are used to predict the next value of AL at (UT+2.5 minutes).

The data translator and processor 19 also implements an averager for averaging the solar wind data using a one hour sliding boxcar or window technique, with the time assignment for prediction being positioned at the middle of the temporal boxcar. The one hour averages are used by the prediction generators 30 and the AL and AU prediction generator 34 as the solar wind data. In one embodiment, the solar wind data is averaged at coordination times (UT−X), (UT−X−2.5 minutes), and (UT−X−5 minutes) to be input to the prediction generators 30, in which X is the lead time for obtaining a prediction at time (UT+2.5 minutes). For neural networks as prediction generators 30 trained to make predictions one hour in advance, X=one hour.

For determining the electric field patterns, the processor 20 uses the value of the IMF at time (UT−25 minutes) for producing a forecast at time (UT+2.5 minutes). The actual forecast lead time is $t_F=(t_P+2.5$ minutes), with the forecasting repeated for each 2.5 minute time step. The geomagnetic forecasting system 10 and method generates a step-wise continuously varying pattern with a 2.5 minute resolution.

Figure 3:
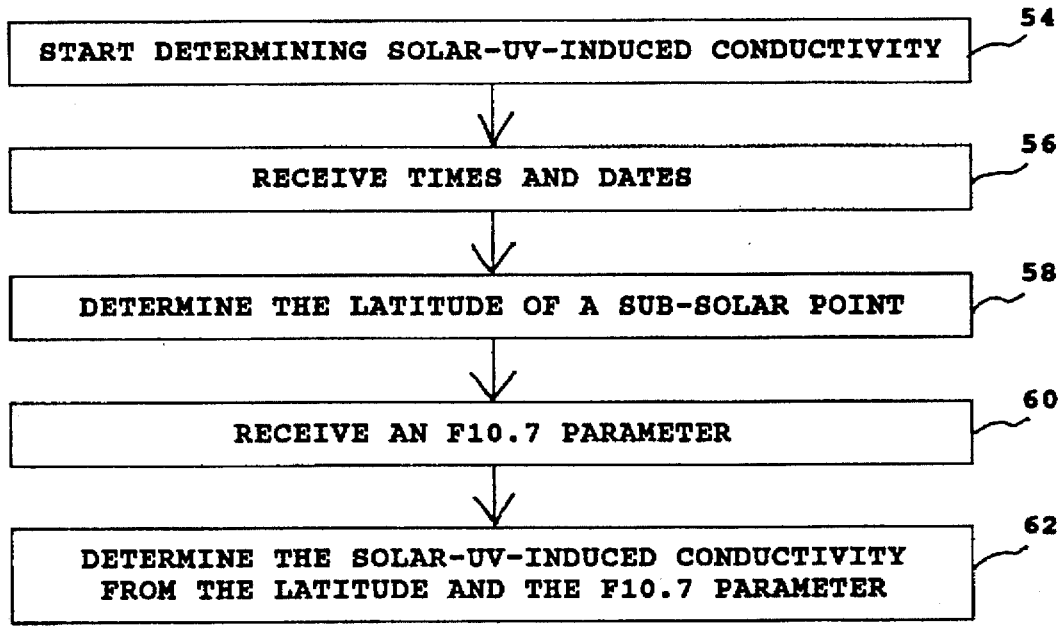
FIG. 3 is a flowchart for determining solar-UV-induced conductivity.

As shown in FIG. 3, the method performs step 44 by starting the determination of solar-UV-induced conductivity in step 54; receiving times and dates, from the input device 18 in step 56; determining the latitude of a sub-solar point in step 58; receiving an F10.7 parameter, as described above, in step 60; and determining the solar ultraviolet (UV) induced conductivity from the latitude and the F10.7 parameter in step 62, in a manner as described in F. J. Rich and N. C. Maynard, "Consequences of Using Simple Analytical Functions for the High-Latitude Convection Electric Field", supra.

Figure 4:
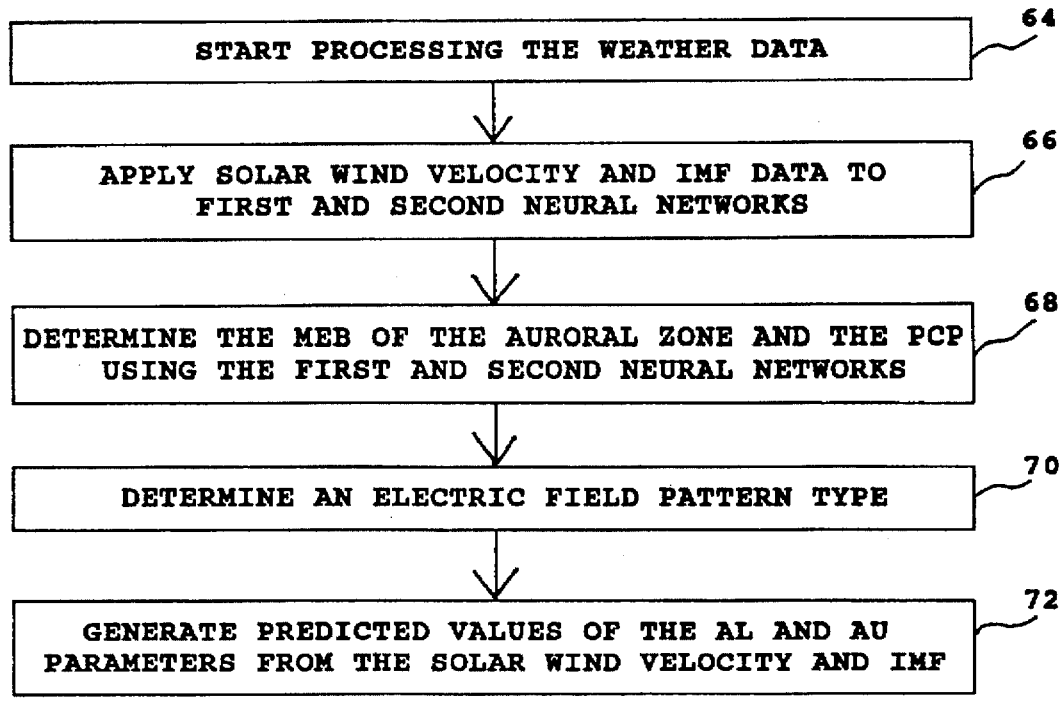
FIG. 4 is a flowchart for the processing of input ground and space weather data.

As shown in FIG. 4, the method performs step 46 by starting the processing the ground and space weather data in step 64; applying the average solar wind velocity, as described above, and interplanetary magnetic field (IMF) data to first and second neural networks in step 66; determining the MEB of the auroral zone and the PCP using the first and second neural networks, respectively, in step 68; determining an electric field pattern type using the IMF in step 70; and generating predicted values of the AL and AU parameters from the solar wind velocity and IMF data in step 72. Step 70 may be a discrete step or may be an integral part of the electric field pattern generator 36.

Using an input-state space approach, the magnetosphere is considered to remain on one or another definite trajectories in phase space that recurrently visit a relatively small state space region, as opposed to varying throughout the entire state space available, At any given time, the solar wind and geomagnetic conditions may be encoded in state vectors which express the state of magnetospheric activity. A combination of input variables and output responses may be used to determine the state of the magnetosphere. Using both linear filtering and non-linear dynamics, non-linear filters may be used to describe the geomagnetic response to the solar wind.

The state vector may be defined from ground magnetometer measurements of the ionospheric currents, such as the AL index, according to:

$$X_n=(X_n,X_{n-1},X_{n-2},\ldots,X_{n-m+1}) \quad (1)$$

where $x_n$ is the value of the index at time n.

The input vector is defined from the solar wind as:

$$U_n=(U_n,U_{n-1},U_{n-2},\ldots,U_{n-l+1}) \quad (2)$$

where $u_n$ is the value of the input driver; i.e. data, at time n. An input driving function such as a leaky rectified electric field function may be defined as:

$$U=v(B^2_z+B^2_y)^{1/2}\sin^4(\theta/2) \text{ where } \tan(\theta)=B_z/B_y \quad (3)$$

with $B_z$ and $B_y$ being components of the IMF, and v being the solar wind velocity. The input-state space is the space $(X_n, U_n)$.

The next x may be determined by:

$$x_{n+1}=A\cdot X_n+B\cdot U_n \quad (4)$$

with A and B being time-varying vectors, and their dimensions l and m are free parameters which correspond to the memory of the input-state space system to internal and external changes. For a filter determined by (A, B), the input-state space is populated with long, continuous time series from a database, stored in memory 22.

From the recurrences of magnetospheric activity in the input-state space $(X_n, U_n)$, which may be detected by pattern recognition techniques such as trained neural networks, a highly variable magnetospheric response to the solar wind input may be determined through the filter (A, B). The coefficients may be calculated from nearest neighbors of a reference point, and the filter coefficients may then be convolved to predict a next point. Once a phase space trajectory is determined, one input variable may be used to track the behavior as long as it remains on that trajectory.

Figure 5:
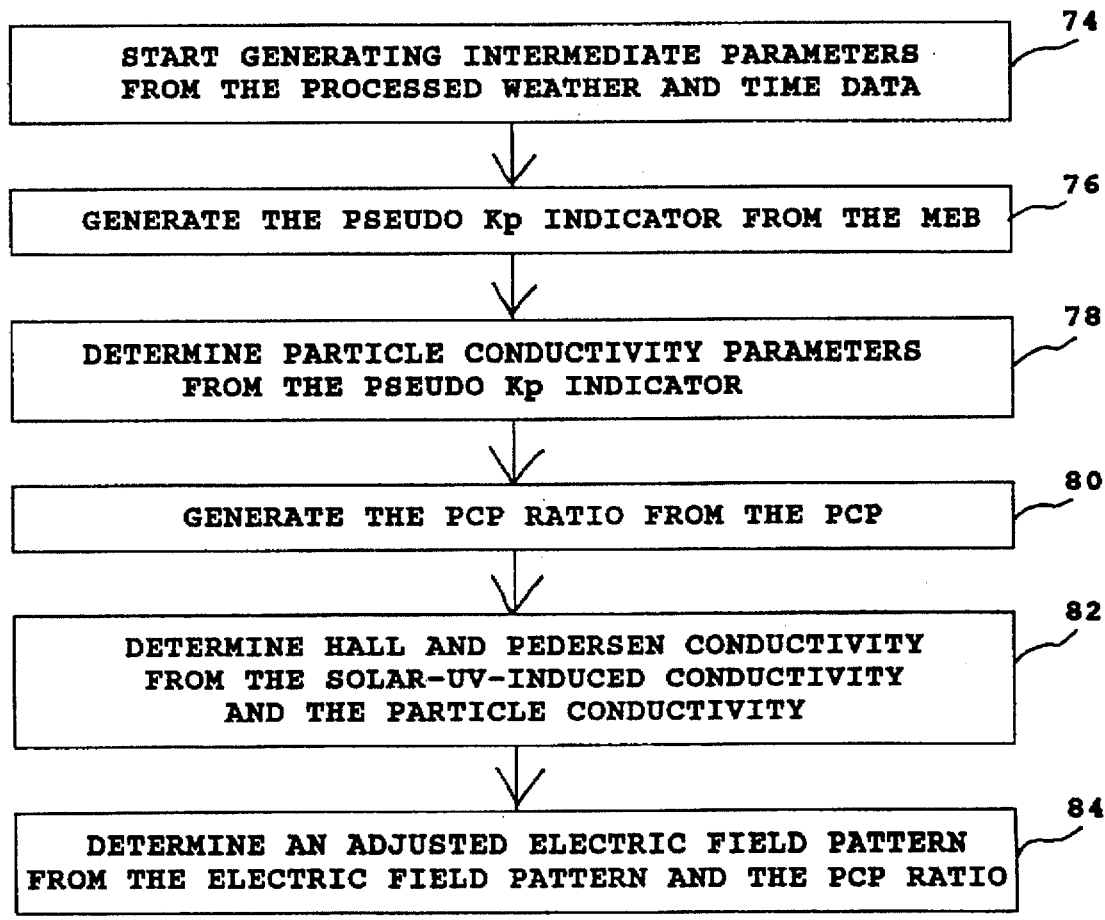
FIG. 5 is a flowchart for the generation of intermediate parameters.

As shown in FIG. 5, the method performs step 48 by starting the generation of intermediate parameters in step 74 from the processed weather and time data; and generating the pseudo Kp indicator from the MEB in step 76, in a manner as follows.

In M. S. Gussenhoven et al., "Systematics of the Equatorward Diffuse Auroral Boundary", JOURNAL OF GEOPHYSICAL RESEARCH, VOL. 88, NO. A7, Jul. 1, 1983, pp. 5692–5708, it was determined that the equatorward boundary of the aurora is statistically related to the Kp index. By inverting the equations described in M. S. Gussenhoven et al., supra, for the dependence of the boundary at midnight (MEB) with Kp, one may obtain a relationship for a pseudo Kp valve based on the MEB. The first prediction generator uses, for example, a neural network to generate a prediction of the MEB, and then the geomagnetic system 10 and method using the relationship of Kp based on the predicted MEB to predict a "pseudo Kp"; i.e. a parameter related to the Kp index.

The generation of the pseudo Kp produces an index having some of the properties of the Kp index, but the pseudo Kp changes with a time step of, for example, about 2.5 minutes, instead of changing at the usually defined 3 hour time interval of Kp; hence, the "pseudo Kp" parameter is related to but not identical with the Kp index known in the art.

In one embodiment, the pseudo Kp indicator is updated every 2.5 minutes to provide rapid response scaling of potential and conductivity patterns. In alternative embodiments, the pseudo Kp indicator may be updated with other time steps. Alternatively, the Kp value and/or the pseudo Kp value may be separately determined by a neural network.

The method then continues by determining particle conductivity parameters using the pseudo Kp indicator in step 78; and generating a PCP scaling ratio in step 80. The PCP of the electric potential pattern generated by the electric field pattern generator 36 is determined from the potential maximum and minimum of the pattern. The ratio of the PCP forecast by the second neural network to the pattern PCP determines the PCP scaling ratio used to adjust the electric field pattern.

The method then continues by determining Hall and Pedersen conductivity by combining the solar-UV-induced conductivity and the particle conductivity in step 82; and determining an adjusted electric field pattern from the electric field pattern and the PCP ratio in step 84.

The static statistical electric field patterns generated by the electric field pattern generator 36 are transformed into time-varying patterns by using the PCP ratio and the pseudo Kp indicator generated from the prediction generators 30 to adjust the size and scale of the electric field patterns. The conductivity patterns determined by the conductivity generator 32 are also sized using the pseudo Kp indicator from the first neural network of the prediction generators 30.

Figure 6:
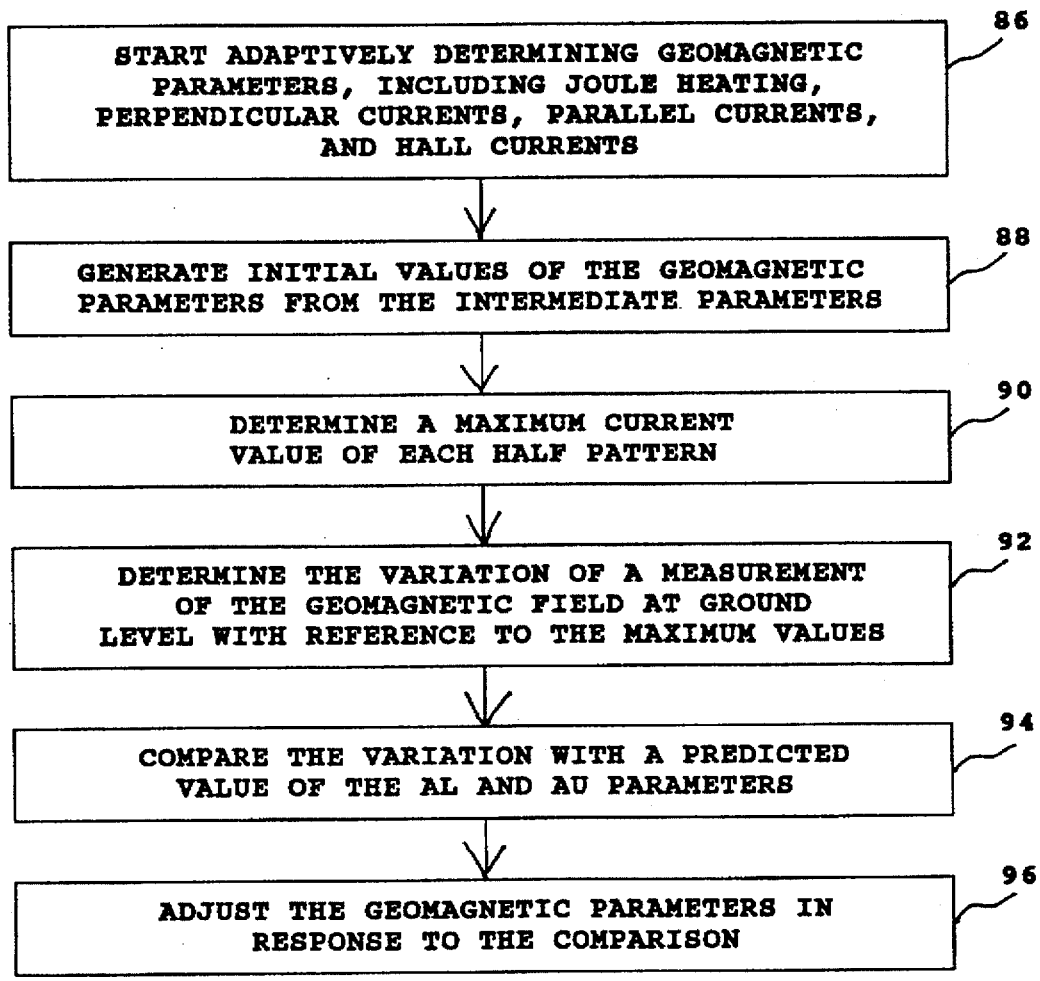
FIG. 6 is a flowchart for the adaptive determination of geomagnetic parameters as output forecasts.

As shown in FIG. 6, the method performs step 50 by starting the adaptive determination of geomagnetic parameters, including Joule heating, total perpendicular currents, parallel currents, and Hall currents in step 86, as well as other electrodynamic parameters useful in determining geomagnetic phenomena. The method continues by generating initial values of the Joule heating, perpendicular currents, parallel currents, and Hall currents from the intermediate parameters in step 88; determining a maximum value of each half of the pattern of Hall currents or of the total perpendicular currents in step 90; determining the variation of the geomagnetic field at ground level with reference to the maximum value in step 92; comparing the variation with a predicted value of the AL and AU parameter in step 94; and adjusting the geomagnetic parameter patterns in response to the comparison in step 96.

The geomagnetic forecasting system 10 and method is thus capable of performing time-varying adjustment of static, statistically-based electric field and conductivity patterns using solar-wind-driven neural network predictors and input-state space AE, AL, and AU index predictions to provide time-dependent predictions of ionospheric currents, such as Hall, Pedersen, and field-aligned currents; electric fields; and Joule heating in the high-altitude ionosphere for space weather forecasting.

Through the use of the prediction generators 30, predictions may be obtained for forecasting a high-resolution, pseudo Kp indicator for pattern adjustments, in addition to forecasting critical boundaries and parameter levels.

In one embodiment, the geomagnetic forecasting system 10 and method are capable of predicting actual ground magnetic field variations created by the ionospheric currents with a lead time of about 45 minutes. Forecast products based on these current predictions are tailored to specification applications. For example, the predictions of the geomagnetic forecasting system 10 and method may be used in calculations of local geomagnetically induced currents in power lines tailored to each specific power company. These predictions allow adjustment of loads and sources within each company's power grid, commensurate with the risk of problems for that particular geographic area. Such improved performance and adaptability of, for example, power utilities to respond to geomagnetic disturbances in a preventive manner provide for increased cost benefits.

For a given application, the stored programs 24 may include specific software which the processor 20 executes to perform the application. Alternatively, the system 10 may include additional processors and/or stored programs (not shown in FIG. 1) for performing the application. For example, the system 10 and method may forecast geomagnetically induced currents from the ground and space weather data. The processor 20 or other processors of the system 10 may then determine such forecasted geomagnetically induced currents as being hazardous to electric power line operation according to predetermined power hazard criteria which is provided to the system 10 in a manner known in the art.

In other embodiments, the processor 20 or other processors of the system 10 may determine such forecasted geomagnetically induced currents as being conducive to corrosive deterioration of pipelines according to predetermined current corrosion criteria; as being hazardous to long line communication circuit operation according to predetermined communication hazard criteria; as producing harmonics in power lines according to predetermined harmonics generation criteria; or as producing harmonics in high reliability manufacturing processes according to predetermined harmonics generation criteria. For example, manufacturing processes may have six sigma reliability, as known in the art, with such high reliability being adversely affected by the harmonics caused by geomagnetic irregularities.

In further embodiments, the processor 20 or other processors of the system 10 may forecast regions of ionospheric irregularities and changes from the ground and space weather data, and then determine such regions as indicating degraded radio communications according to predetermined radio communications criteria; or as indicating degraded accuracy of navigation systems according to predetermined navigation criteria.

The predetermined criteria may be pre-programmed or incorporated into the stored programs executed by the processor 20, and thus are used in conjunction with the forecasts by the geomagnetic forecasting system and method to determine an application-specific analysis of such geomagnetic effects. With such forecasting and analysis of the geomagnetic effects, improved mitigation of the geomagnetic effects is attainable.

While the disclosed geomagnetic forecasting system and method have been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A system for forecasting geomagnetic events and resulting ionospheric currents from ground and space weather data, including solar wind velocity data and interplanetary magnetic field data, the system comprising:

a processor including:

a first prediction generator for predicting a midnight equatorial boundary (MEB) value from the ground and space weather data;

a second prediction generator for predicting a polar cap potential (PCP) value from the ground and space weather data;

an AL and AU prediction generator for predicting AL and AU values from the ground and space weather data;

means for generating a pseudo Kp value from the MEB value;

an electric field pattern generator for determining electric field patterns from the pseudo Kp value, the PCP value, and the ground and space weather data;

a conductivity generator for determining conductivity values from the ground and space weather data and the pseudo Kp value; and an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents.

2. The system of claim 1 wherein the first prediction generator includes a neural network for predicting the MEB value from the ground and space weather data.

3. The system of claim 1 wherein the second prediction generator includes a neural network for predicting the PCP value from the ground and space weather data.

4. The system of claim 1 wherein the processor forecasts geomagnetically induced currents from the ground and space weather data, and determines such forecasted geomagnetically induced currents as being hazardous to electric power line operation according to predetermined power hazard criteria.

5. The system of claim 1 wherein the processor forecasts geomagnetically induced voltages from the ground and space weather data, and determines such forecasted geomagnetically induced voltages as being hazardous to long line communication circuit operation according to predetermined communication hazard criteria.

6. The system of claim 1 wherein the processor forecasts geomagnetically induced currents from the ground and space weather data, and determines such forecasted geomagnetically induced currents which produce harmonics in power lines according to predetermined harmonics generation criteria.

7. The system of claim 1 wherein the processor forecasts regions of ionospheric irregularities and changes from the ground and space weather data, and determines such regions as indicating degraded radio communications according to predetermined radio communications criteria.

8. A system for forecasting geomagnetic events and resulting ionospheric currents from ground and space weather data, including solar wind velocity data and interplanetary magnetic field data, the system comprising:

a processor including:
a first prediction generator for predicting a midnight equatorial boundary (MEB) value from the ground and space weather data;
a second prediction generator for predicting a polar cap potential (PCP) value from the ground and space weather data;
an AL and AU prediction generator for predicting AL and AU values from the ground and space weather data;
means for generating a Kp-related value from the MEB value;
an electric field pattern generator for determining electric field patterns from the Kp-related value, the PCP value, and the ground and space weather data;
a conductivity generator for determining conductivity values from the ground and space weather data and the Kp-related value; and
an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents;
wherein the processor forecasts geomagnetically induced voltages from the ground and space weather data, and determines such forecasted geomagnetically induced voltages as being hazardous to electric power line operation according to predetermined power hazard criteria.

9. A system for forecasting geomagnetic events and resulting ionospheric currents from ground and space weather data, including solar wind velocity data and interplanetary magnetic field data, the system comprising:

a processor including:
a first prediction generator for predicting midnight equatorial boundary (MEB) value from the ground and space weather data;
a second prediction generator for predicting a polar cap potential (PCP) value from the ground and space weather data;
an AL and AU prediction generator for predicting AL and AU values from the ground and space weather data;
means for generating a Kp-related value from the MEB value;
an electric field pattern generator for determining electric field patterns from the Kp-related value, the PCP value, and the ground and space weather data;
a conductivity generator for determining conductivity values from the ground and space weather data and the Kp-related value; and
an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents; wherein the processor forecasts geomagnetically induced currents from the ground and space weather data, and determines such forecasted geomagnetically induced currents as being conducive to corrosive deterioration of pipelines according to predetermined current corrosion criteria.

10. A system for forecasting geomagnetic events and resulting ionospheric currents from ground and space weather data, including solar wind velocity data and interplanetary magnetic field data, the system comprising:

a processor including:
a first prediction generator for predicting a midnight equatorial boundary (MEB) value from the ground and space weather data;
a second prediction generator for predicting a polar cap potential (PCP) value from the ground and space weather data;
an AL and AU prediction generator for predicting AL and AU values from the ground and space weather data;
means for generating a Kp-related value from the MEB value;
an electric field pattern generator for determining electric field patterns from the Kp-related value, the PCP value, and the ground and space weather data;
a conductivity generator for determining conductivity values from the ground and space weather data and the Kp-related value; and
an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents;
wherein the processor forecasts geomagnetically induced voltages from the ground and space weather data, and determines such forecasted geomagnetically induced voltages as being conducive to corrosive deterioration of pipelines according to predetermined current corrosion criteria.

11. A system for forecasting geomagnetic events and resulting ionospheric currents from ground and space weather data, including solar wind velocity data and interplanetary magnetic field data, the system comprising:

a processor including:
- a first prediction generator for predicting a midnight equatorial boundary (MEB) value from the ground and space weather data;
- a second prediction generator for predicting a polar cap potential (PCP) value from the ground and space weather data;
- an AL and AU prediction generator for predicting AL and AU values from the ground and space weather data;
- means for generating a Kp-related value from the MEB value;
- an electric field pattern generator for determining electric field patterns from the Kp-related value, the PCP value, and the ground and space weather data;
- a conductivity generator for determining conductivity values from the ground and space weather data and the Kp-related value; and
- an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents;
- wherein the processor forecasts geomagnetically induced currents from the ground and space weather data, and determines such forecasted geomagnetically induced currents as being hazardous to long line communication circuit operation according to predetermined communication hazard criteria.

12. A system for forecasting geomagnetic events and resulting ionospheric currents from ground and space weather data, including solar wind velocity data and interplanetary magnetic field data, the system comprising:

a processor including:
- a first prediction generator for predicting a midnight equatorial boundary (MEB) value from the ground and space weather data;
- a second prediction generator for predicting a polar cap potential (PCP) value from the ground and space weather data;
- an AL and AU prediction generator for predicting AL and AU values from the ground and space weather data;
- means for generating a Kp-related value from the MEB value;
- an electric field pattern generator for determining electric field patterns from the Kp-related value, the PCP value, and the ground and space weather data;
- a conductivity generator for determining conductivity values from the ground and space weather data and the Kp-related value; and
- an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents;
- wherein the processor forecasts geomagnetically induced currents from the ground and space weather data, and determines such forecasted geomagnetically induced currents which produce harmonics in six sigma manufacturing processes according to predetermined harmonics generation criteria.

13. A system for forecasting geomagnetic events and resulting ionospheric currents from ground and space weather data, including solar wind velocity data and interplanetary magnetic field data, the system comprising:

a processor including:
- a first prediction generator for predicting a midnight equatorial boundary (MEB) value from the ground and space weather data;
- a second prediction generator for predicting a polar cap potential (PCP) value from the ground and space weather data;
- an AL and AU prediction generator for predicting AL and AU values from the ground and space weather data;
- means for generating a KD-related value from the MEB value;
- an electric field pattern generator for determining electric field patterns from the Kp-related value, the PCP value, and the ground and space weather data;
- a conductivity generator for determining conductivity values from the ground and space weather data and the Kp-related value; and
- an adaptive feedback generator for adaptively generating geomagnetic parameters from the conductivity values, the electric field patterns, and the predicted AL and AU values using feedback, the geomagnetic parameters indicating the forecasted geomagnetic events and resulting ionospheric currents;
- wherein the processor forecasts regions of ionospheric irregularities and changes from the ground and space weather data, and determines such regions as indicating degraded accuracy of navigation systems according to predetermined navigation criteria.

14. A system for forecasting time-varying geomagnetic events and resulting time-varying ionospheric currents from ground and space weather data, including solar wind velocity data and interplanetary magnetic field data, the system comprising:

a processor including:
- a first prediction generator for predicting a midnight equatorial boundary (MEB) value from the ground and space weather data;
- a second prediction generator for predicting a polar cap potential (PCP) value from the ground and space weather data;
- an AL and AU prediction generator for predicting AL and AU values from the ground and space weather data;
- means for generating a time-varying pseudo Kp value from the MEB value;
- an electric field pattern generator for determining time-varying electric field patterns from the pseudo Kp value, the PCP value, and the ground and space weather data;
- a conductivity generator for determining conductivity values from the ground and space weather data and the time-varying pseudo Kp value; and
- an adaptive feedback generator for adaptively generating time-varying geomagnetic parameters from the conductivity values, the time-varying electric field patterns, and the predicted AL and AU values using feedback, the time-varying geomagnetic parameters indicating the forecasted geomagnetic events and resulting ionospheric currents.

15. The system of claim 14 wherein the processor generates and outputs the time-varying geomagnetic parameters indicating the forecasted geomagnetic events and resulting ionospheric currents to facilitate implementation of mitigating actions to minimize the effects of such forecasted geomagnetic events and resulting ionospheric currents.

16. The system of claim 14 wherein the processor generates and outputs the time-varying geomagnetic parameters indicating the forecasted geomagnetic events and resulting ionospheric currents with a predetermined lead time to the actual geomagnetic events and resulting ionospheric currents.

17. The system of claim 16 wherein the processor generates and outputs the time-varying geomagnetic parameters with a predictive lead time of about 45 minutes.

18. The system of claim 16 wherein each of the first and second prediction generators includes a neural network trained to provide the predicted MEB value and PCP value, respectively, with a predictive lead time of about one hour.

19. The system of claim 14 further including:

a data pre-processor for averaging a portion of the ground and space weather data using a predetermined data window; and the processor uses the averaged portion of the ground and space weather data to generate the time-varying geomagnetic parameters to indicate the forecasted geomagnetic events and resulting ionospheric currents at a time corresponding to a predetermined point in the data window.

* * * * *